(12) United States Patent
Rashad et al.

(10) Patent No.: US 8,341,232 B2
(45) Date of Patent: Dec. 25, 2012

(54) RELATIONSHIP IDENTIFICATION BASED ON EMAIL TRAFFIC

(75) Inventors: Tamer Rashad, Watchung, NJ (US); Kenneth Brady, Ridgefield, NJ (US); Kenny Keung Sing Lee, Brooklyn, NY (US); Jillian Moo-Young, New York, NY (US); Sapna Vyas, Forest Hills, NY (US)

(73) Assignee: Bank of America Corporation, Charlotte, NC (US)

( * ) Notice: Subject to any disclaimer, the term of this patent is extended or adjusted under 35 U.S.C. 154(b) by 145 days.

(21) Appl. No.: 12/794,190

(22) Filed: Jun. 4, 2010

(65) Prior Publication Data

US 2011/0078259 A1    Mar. 31, 2011

Related U.S. Application Data

(60) Provisional application No. 61/247,441, filed on Sep. 30, 2009.

(51) Int. Cl.
  *G06F 15/16* (2006.01)
(52) U.S. Cl. ........................ 709/206; 709/207
(58) Field of Classification Search .............. 709/206, 709/207
  See application file for complete search history.

(56) References Cited

U.S. PATENT DOCUMENTS

| 7,454,470 | B1 * | 11/2008 | Isaacs et al. ........... 709/206 |
| 7,788,325 | B1 | 8/2010 | Glidden |
| 8,032,598 | B1 | 10/2011 | He et al. |
| 2003/0037116 | A1 | 2/2003 | Nolan et al. |
| 2003/0115280 | A1 | 6/2003 | Quine et al. |
| 2003/0163530 | A1 | 8/2003 | Ribak et al. |
| 2005/0065980 | A1 | 3/2005 | Hyatt et al. |
| 2006/0004869 | A1 * | 1/2006 | Yuster et al. ........... 707/104.1 |
| 2006/0041547 | A1 | 2/2006 | Karch |

(Continued)

FOREIGN PATENT DOCUMENTS

GB    2 401 002 A    10/2004

(Continued)

OTHER PUBLICATIONS

U.K. Intellectual Property Office Search Report in Application No. GB1016393.9, dated Jan. 26, 2011, 2 pages.

(Continued)

*Primary Examiner* — Krista Zele
*Assistant Examiner* — Andrew Georgandellis
(74) *Attorney, Agent, or Firm* — Baker Botts L.L.P.

(57) ABSTRACT

A method comprises identifying one or more relationships between a target individual and one or more persons based at least in part on a plurality of emails. The plurality of emails comprise one or more outbound emails, which may comprise emails sent to the target individual from the one or more persons. The plurality of emails further comprise one or more inbound emails, which may comprise emails sent from the target individual to the one or more persons. The method further comprises, for each of the one or more relationships, calculating an amount of outbound emails and an amount of inbound emails. The method further comprises assigning a classification to each of the one or more relationships based at least in part on the amount of outbound emails and the amount of inbound emails. The method further comprises sorting the one or more relationships based at least in part on the classification assigned to each of the one or more relationships. The method may further comprise storing information regarding the sorted relationships.

26 Claims, 6 Drawing Sheets

U.S. PATENT DOCUMENTS

| | | | |
|---|---|---|---|
| 2006/0212491 | A1 | 9/2006 | Agrawal et al. |
| 2007/0129090 | A1 | 6/2007 | Tarn |
| 2008/0109214 | A1 | 5/2008 | Shaw |
| 2008/0207271 | A1* | 8/2008 | Krutik et al. .......... 455/566 |
| 2009/0119376 | A1 | 5/2009 | Bomma |
| 2009/0177744 | A1 | 7/2009 | Marlow et al. |
| 2010/0161662 | A1 | 6/2010 | Jonas et al. |

FOREIGN PATENT DOCUMENTS

| | | |
|---|---|---|
| GB | 2 440 173 A | 1/2008 |
| WO | WO 2004/102858 | 11/2004 |
| WO | WO 2008/061096 | 5/2008 |
| WO | WO 2009/152489 | 12/2009 |

OTHER PUBLICATIONS

Patent Pending U.S. Appl. No. 12/794,168 entitled *Intelligent Sorting and Correlation of Email Traffic* in the name of Tamer Rashad, et al.; 43 total pages, filed Jun. 4, 2010.

Patent Pending U.S. Appl. No. 12/794,359 entitled *Intelligent Derivation of Email Addresses* in the name of Tamer Rashad, et al.; 43 total pages, filed Jun. 4, 2010.

Patent Pending U.S. Appl. No. 12/794,371 entitled *Auditing Search Requests in a Relationship Analysis System* in the name of Tamer Rashad, et al.; 43 total pages, filed Jun. 4, 2010.

United Kingdom Intellectual Property Office Search Report in Application No. GB1016395.4 dated Jan. 27, 2011, 3 pages.

United Kingdom Intellectual Property Office Search Report in Application No. GB1016394.7 dated Jan. 27, 2011, 4 pages.

United Kingdom Intellectual Property Office Search Report in Application No. GB1016397.0 dated Jan. 27, 2011, 3 pages.

USPTO Non-final office action for U.S. Appl. No. 12/794,359, Feb. 17, 2012.

USPTO Non-final office action for U.S. Appl. No. 12/794,168, Jan. 11, 2012.

\* cited by examiner

| First Name | Middle Name | Last Name |
|---|---|---|
| John | Quitin | Public |

| # | Format | Type Separator |
|---|---|---|
| 1 | firstinitial.lastname@example.com | Dot |
| 2 | firstname.lastinitial@example.com | Dot |
| 3 | firstname.lastname@example.com | Dot |
| 4 | firstname.middleinitial.lastname@example.com | Dot |
| 5 | lastname.firstname@example.com | Dot |
| 6 | firstinitial-lastname@example.com | Hyphen |
| 7 | firstname-lastinitial@example.com | Hyphen |
| 8 | firstname-lastname@example.com | Hyphen |
| 9 | firstname-middleinitial-lastname@example.com | Hyphen |
| 10 | lastname-firstname@example.com | Hyphen |
| 11 | firstinitiallastname@example.com | None |
| 12 | firstname@example.com | None |
| 13 | firstnamelastinitial@example.com | None |
| 14 | firstnamelastname@example.com | None |
| 15 | firstnamemiddleinitiallastname@example.com | None |
| 16 | lastnamefirstname@example.com | None |
| 17 | firstinitial_lastname@example.com | Underscore |
| 18 | firstname_lastinitial@example.com | Underscore |
| 19 | firstname_lastname@example.com | Underscore |
| 20 | firstname_middleinitial_lastname@example.com | Underscore |
| 21 | lastname_firstname@example.com | Underscore |

FIG. 4

Sorting of Current Relationship Types

1. Board Affiliations
2. Outlook Know Well
3. Email Traffic A (Any combination of H + M)
4. Email Traffic B (Any combination including L where there is traffic inbound and outbound)
5. Outlook Know a Little
6. Email Traffic C (Any combination that includes at least one "None" for inbound or outbound traffic)

520

Sorting Priority of Email Traffic — 510

| OUTBOUND EMAIL VOLUME | | | | |
|---|---|---|---|---|
| H | C | B | A | A |
| M | C | B | A | A |
| L | C | B | B | B |
| None | C | C | C | C |
| | None | L | M | H |
| | INBOUND EMAIL VOLUME | | | |

<= Vice Chairman/ Jane R. Doe

500

| 530 Board Affiliation | | | | |
|---|---|---|---|---|
| OLK KW | 1 | Average Joe XYZ Corp. Current Exec | Vice Chairman(06 - current) ==> | Corp. 1 Fund A |
| OLK KW | 2 | John Doe XYZ Corp. Current Exec | Contact Database (Know Well) ==> | Jane R. Doe |
| E2E (A) | 3 | John Public XYZ Corp. Current Exec | Contact Database (Know Well) ==> | Jane R. Doe |
| E2E (B) | 4 | Jane Public XYZ Corp. Current Exec | Email Contact ==> Outbound Inbound | Jane R. Doe |
| OLK KL | 5 | Richard Roe XYZ Corp. Current Exec | Email Contact Outbound Inbound | Jane R. Doe |
| OLK KL | 6 | Jane Roe XYZ Corp. Current Exec | Contact Database (Know A Little) ==> | Jane R. Doe |
| OLK KL | 7 | Mister Littleshot XYZ Corp. Current Exec | Contact Database (Know A Little) ==> | Jane R. Doe |
| E2E (C) | 8 | Mister Bigshot XYZ Corp. Current Exec | Contact Database (Know A Little) ==> | Jane R. Doe |
| | 9 | Miss Bigshot XYZ Corp. Current Exec | Email Contact ==> Outbound None Inbound | Jane R. Doe |

*FIG. 5*

RELATIONSHIP IDENTIFICATION BASED ON EMAIL TRAFFIC

RELATED APPLICATIONS

This application claims priority to U.S. Provisional Patent Application Ser. No. 61/247,441, entitled "RELATIONSHIP IDENTIFICATION BASED ON EMAIL TRAFFIC" which was filed on Sep. 30, 2009. U.S. Provisional Patent Application Ser. No. 61/247,441 is hereby incorporated by reference.

TECHNICAL FIELD OF THE DISCLOSURE

This disclosure relates in general to email management systems and, more particularly, to relationship identification based on email traffic.

BACKGROUND

As organizations become more complex and diversified, maintaining and organizing outside business contacts becomes increasingly difficult. One part of an organization may not be aware of existing or ongoing relationships developed or maintained in other parts of an organization. As a result, business relationships with persons or entities outside the organization may stagnate. Additionally, a person outside an organization may be contacted by more than one person inside the organization, which may have negative repercussions for the business relationship. As organizations grow, traditional computer and email systems are unable to effectively use email traffic data to identify, organize, and leverage business relationships.

SUMMARY

In accordance with the present disclosure, the disadvantages and problems associated with systems and methods of analyzing email traffic have been substantially reduced or eliminated.

In some embodiments, a method comprises receiving a plurality of emails. Each of the plurality of emails comprises message information and header information. The header information comprises subject information and one or more email addresses. The method further comprises generating filtered email data comprising email addresses by at least filtering message information and subject information from each of the plurality of emails. The method further comprises correlating sender information and recipient information in the filtered email data, the correlation based at least in part on the one or more email addresses. The method further comprises storing in memory one or more email addresses from the filtered email data.

In other embodiments, a method comprises receiving, by a processor, a query comprising at least one name of a target individual. The method further comprises determining, by the processor, a plurality of email addresses. Each of the determined email addresses has a respective prefix based at least in part upon the at least one name of the target individual, and the determination is based at least in part upon statistical data regarding common syntaxes for email addresses. The method further comprises determining email traffic based at least in part upon the determined email addresses. The method further comprises determining, by the processor, one or more relationships of the target individual based at least in part upon the determined email traffic.

In yet other embodiments, a method comprises identifying one or more relationships between a target individual and one or more persons based at least in part on a plurality of emails. The plurality of emails comprise one or more outbound emails, which may comprise emails sent to the target individual from the one or more persons. The plurality of emails further comprise one or more inbound emails, which may comprise emails sent from the target individual to the one or more persons. The method further comprises, for each of the one or more relationships, calculating an amount of outbound emails and an amount of inbound emails. The method further comprises assigning a classification to each of the one or more relationships based at least in part on the amount of outbound emails and the amount of inbound emails. The method further comprises sorting the one or more relationships based at least in part on the classification assigned to each of the one or more relationships. The method may further comprise storing information regarding the sorted relationships.

In yet other embodiments, a method comprises receiving one or more search requests from one or more users, each search request comprising a request for relationship information that is determined using email data, and each search request including at least one of a first name, a last name, and a company name of a target individual. The method further comprises storing search information associated with the one or more search requests. The search information comprises a plurality of fields including a user identification associated with each of the one or more users, a name of the one or more users, a type of search request received, a name of the target individual, an email address associated with the target individual, and a time at which the search request is received. The method may further comprise generating an audit report based at least in part on the stored search information, wherein the audit report comprises at least one of the plurality of fields. The method further comprises storing the audit report.

The present disclosure provides several important technical advantages. One advantage is that a computer system may provide an intelligent display of relationship information based on email traffic to or from an enterprise. Another advantage is that the system may allow for the intelligent collection, filtration, and/or correlation of emails sent to or from an enterprise. If a user desires to identify a network of business relationships for a target individual external to the enterprise, the system may allow the user to input information associated with the target individual such as, for example, a first name, a last name, a middle initial, a company name, and/or a company domain. The system may then generate a list of possible email addresses for the target individual. Using data regarding email traffic, the system may identify and display relationships between one or more individuals and a target individual that may be external to the enterprise. The list may be prioritized based on the strength of each relationship. Thus, without knowing a particular target individual's email address, the system may allow a user to discover information about any existing relationships between one or more individuals and a target individual.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 4 illustrates a table comprising example permutations of email addresses generated by an email analyzer, according to certain embodiments;

FIG. 5 illustrates an example GUI displaying the results of a query, according to certain embodiments;

DETAILED DESCRIPTION

Figure 1:
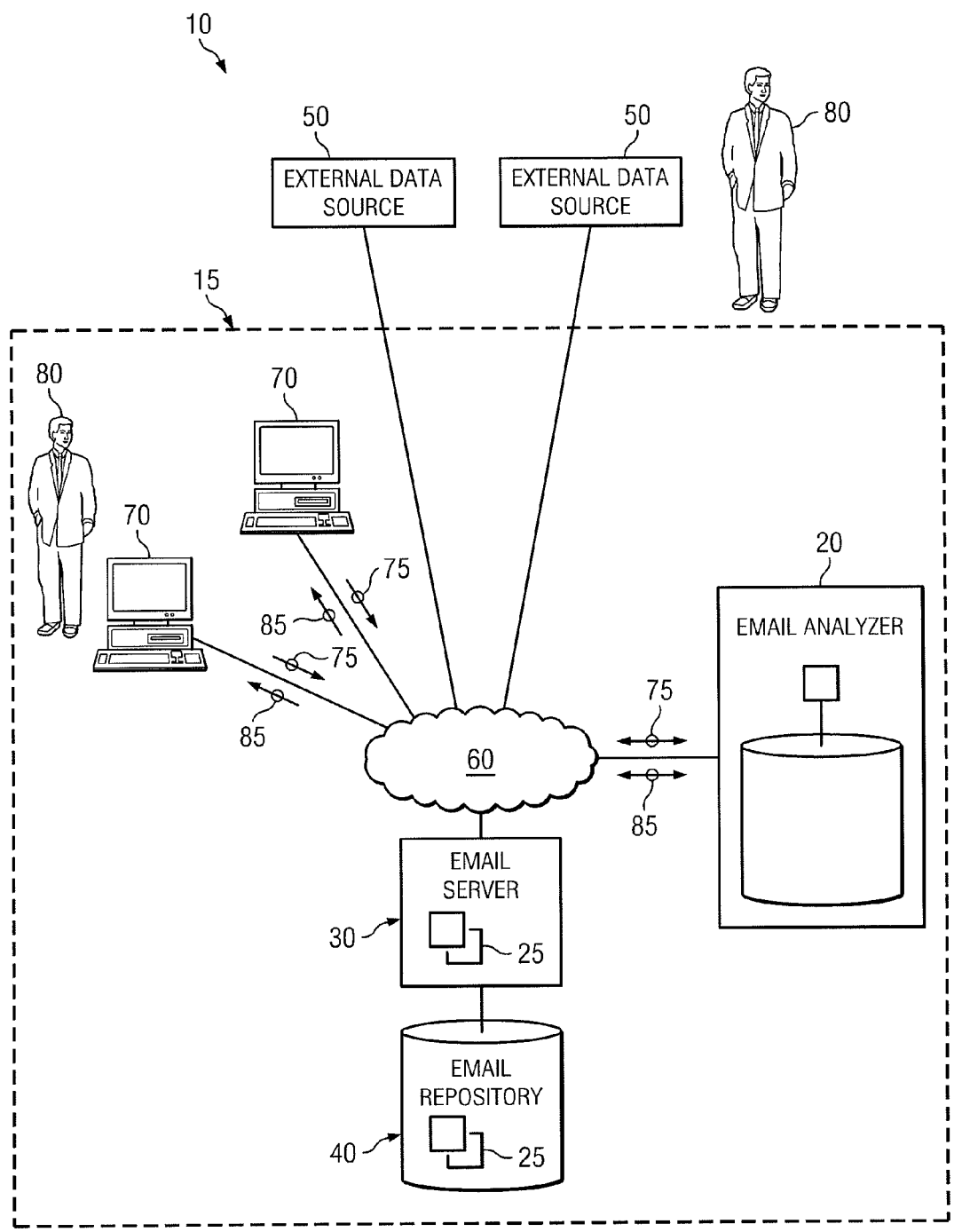
FIG. 1 illustrates a system for analyzing email traffic to identify business relationships, according to certain embodiments.

FIG. 1 illustrates a system 10 for analyzing email traffic to identify business relationships, according to certain embodiments. System 10 may generally receive, filter, and correlate email data 25 to identify a network of business relationships of a target individual 80. System 10 may generate likely email addresses of target individual 80 based at least in part on a first name, last name, middle name (or initial thereof) and a company name, domain associated with a company, and/or other information associated with target individual 80. In some embodiments, system 10 may prioritize the identified business relationships based on certain characteristics such as, for example, the volume of email traffic sent to and/or from target individual 80. System 10 may audit searches performed by users and may track and display audit trails containing various data attributes. System 10 may include an email analyzer 20, email server 30, email repository 40, one or more external data sources 50, one or more networks 60, and one or more clients 70.

Email analyzer 20 may receive, process, and/or analyze email data 25 sent to or from enterprise 15. In particular embodiments, email data 25 may include one or more emails sent to or from individuals in enterprise 15. For each email, email data may comprise header information, message text, metadata (e.g., time sent, date modified, etc.), and/or any suitable information. Email data 25 may include entire emails or only portions of emails. In some embodiments, the message body and/or subject information (e.g., the subject line) of an email may be filtered from email data 25. In some embodiments, email analyzer 20 may process email data 25 to generate correlated and filtered data that may be efficiently searched and/or analyzed.

In some embodiments, email analyzer 20 may generate, based on received search terms, a list of potential email addresses for target individual 80. Target individual 80 may be any person, group of persons, and/or entity within or without enterprise 15. In some embodiments, target individual 80 is external to and/or not affiliated with enterprise 15. Email analyzer 20 may allow a user to identify a network of business relationships that target individual 80 has with other people or entities. In particular embodiments, a user may input into system 10 the first name, last name, and/or middle name (or initial thereof) and/or a company name, a domain associated with a company, and/or other suitable information associated with target individual 80. Using rules based on statistical data, email analyzer 20 may generate a list of potential email addresses associated with target individual 80. Email analyzer 20 may then identify and intelligently display possible relationships that target individual 80 has with persons in enterprise 15 and persons outside of, or not belonging to, enterprise 15. For example, based on email traffic to and/or from the potential email addresses for target individual 80, email analyzer 20 may group, sort, and/or classify relationships of target individual 80. Email analyzer 20 may then identify and intelligently display possible relationships that target individual 80 has with persons inside and/or outside of enterprise 15. For example, based on email traffic to and from the potential email addresses for target individual 80, email analyzer 20 may group, sort, and/or classify relationships of target individual 80.

In some embodiments, email analyzer 20 may track and display an audit trail for each search conducted by a user of system 10. The audit trail for a particular search may comprise various data attributes such as, for example, the name of the user performing the search, the type of search (e.g., company name, individual name, exact email address, etc.), the company and/or individual name in the search, the time of the search, and/or any suitable information. Email analyzer 20 may be configured to generate periodic audit reports based on predetermined thresholds of usage activity. Email analyzer 20 may also generate audit reports based on a request from a user of system 10.

Email analyzer 20 may be any suitable computing device comprising a processor and a memory. For example, email analyzer 20 may comprise one or more workstations, laptops, blade servers, server farms, and/or stand alone servers. Although shown in FIG. 1 as comprising a single component, email analyzer 20 may, in some embodiments, represent functionality provided by several separate physical components. In some embodiments, email analyzer 20 may represent software operating on one or more servers. Although FIG. 1 illustrates, for purposes of example, a single email analyzer 20, particular embodiments of system 10 may include any appropriate number of email analyzers 20 arranged in any suitable configuration. In embodiments that include multiple email analyzers 20, each respective email analyzer 20 may be operable to communicate, directly or indirectly, with one or more other email analyzers 20 over network 60.

As shown in FIG. 1, email analyzer 20 may be maintained and/or operated by enterprise 15. Enterprise 15 may represent any organization, business, association, group, and/or entity organized for any suitable purpose(s), such as, for example, commercial, educational, and/or non-profit purpose(s). Although FIG. 1 illustrates enterprise 15 comprising a single location, enterprise 15 may include any number of locations, and system 10 may operate across multiple locations or in a single location.

Enterprise 15 may comprise one or more email servers 30. Email server 30 may send and/or receive emails generated by users within enterprise 15 and may receive emails from persons outside enterprise 15 sent to users within enterprise 15. In particular embodiments, email server 30 may represent a Microsoft Exchange email server, a Unix-based server running a sendmail or Simple Mail Transfer Protocol application, and/or other appropriate type of server. Additionally, or alternatively, email server 30 may maintain a list of organizational contacts for each user or group of users of system 10. For example, in particular embodiments, email server 30 may include contact manager software (e.g., Microsoft Outlook) that organizes and/or stores contact information for persons within and without enterprise 15. Email server 30 may be communicatively coupled, directly or indirectly, to email repository 40. Email server 30 may store, archive, and/or otherwise retain copies of emails on email repository 40.

Email repository 40 may store emails sent, received, and/or processed by email server 30. In particular embodiments, email repository 40 may represent a database connected to email server 30 and/or a database process executing on email server 30. Additionally or alternatively, email repository 40 may be capable of storing, archiving, and/or otherwise maintaining a database of organizational contacts. As discussed above, email server 30 may include contact manager software that organizes and/or stores contact information. Email repository 40 may store a database of contact information utilized by contact manager software. Email repository 40 may be communicatively coupled, directly or indirectly, to email server 30. In particular embodiments, email repository 40 may communicate with email server 30 over network 60.

Email repository 40 may be any suitable computing device comprising a processor and a memory. For example, email repository 40 may comprise one or more workstations, laptops, blade servers, server farms, and/or stand alone servers. Although shown as comprising a single component, email repository 40 may, in some embodiments, represent functionality provided by several separate physical components. In particular embodiments, email repository 40 may represent software operating on one or more servers. Although FIG. 1 illustrates a single email repository 40, particular embodiments may include any appropriate number of email repositories 40.

As noted above, system 10 may comprise one or more external data sources 50. External data source 50 may represent one or more sources of information that facilitate the operation of system 10. In particular embodiments, external data source 50 may represent one or more data servers external to enterprise 15 that may be communicatively coupled to one or more components of system 10. In particular embodiments, external data source 50 may communicate, directly or indirectly, with email analyzer 20 over network 60. For example, external data source 50 may include a data feed from a market center, trading exchange, financial information database, contact information database, and/or an electronic directory maintained by a third party (e.g., Hoover's, BoardEx, Big Dough, Bloomberg, Ipreo, and/or Salesforce.com). Access to, or receiving information from, one or more external data sources 50 may provide email analyzer 20 with information regarding an external organization's executives, domain name, address, key officers and/or employees, and/or any suitable information pertaining to individuals and/or organizations outside of enterprise 15.

External data source 50 may communicate with system 10 via network 60. Network 60 may represent any form of communication network supporting circuit-switched, packet-based, and/or any other suitable type of communications. Network 60 may additionally include any other components of system 10 capable of transmitting and/or receiving information over a communication network, including email analyzer 20, email server 30, email repository 40, and/or clients 70. Although shown in FIG. 1 as a single element, network 60 may represent one or more separate networks (including all or parts of various different networks) that are separated and serve different respective email analyzers 20 and/or email repositories 40. Network 60 may include routers, hubs, switches, firewalls, content switches, gateways, call controllers, and/or any other suitable components in any suitable form or arrangement. Network 60 may include, in whole or in part, one or more secured and/or encrypted Virtual Private Networks (VPNs) operable to couple one or more network elements together by operating or communicating over elements of a public or external communication network. In general, network 60 may comprise any combination of public or private communication equipment such as elements of the public switched telephone network (PSTN), a global computer network such as the Internet, a local area network (LAN), a wide area network (WAN), or other appropriate communication equipment.

Users may interact with system 10 using clients 70. Client 70 may send and/or receive emails and may generate one or more queries 75 for target individuals 80. Query 75 may represent an electronic request for relationship information pertaining to a particular target individual 80. A user may input query 75 into client 70, which may send query 75 to email analyzer 20. Query 75 may include one or more characteristics of target individual 80. For example, a user may generate query 75 for target individual 80 by inputting into client 70 at least a portion of the name, email address, and/or company name of target individual 80. Client 70 may display the results of query 75 on a display device.

Clients 70 may represent general or special-purpose computers operating software applications capable of performing the described operations. For example, clients 70 may include, but are not limited to, laptop computers, desktop computers, and/or portable data assistants (PDAs). Additionally, in particular embodiments, client 70 may include one or more processors operable to execute computer logic and/or software encoded on tangible media that perform the described functionality. Client 70 may include one or more input devices such as a keyboard, trackball, mouse, and/or one or more Graphical User Interfaces (GUIs) through which a user may interact with the logic executing on the processor of client 70. Client 70 may include any appropriate combination of hardware, software, and/or encoded logic suitable to perform the described functionality. Clients 70 may be communicatively coupled with email analyzer 20 and/or email server 30, directly or indirectly, over network 60. Although FIG. 1 illustrates, for purposes of example, a particular number and type of clients 70, alternative embodiments of system 10 may include any appropriate number and type of clients 70.

In operation, system 10 may use email data 25 to identify and leverage relationships that target individual 80 has with people within and/or without enterprise 15. In some embodiments, email analyzer 20 in system 10 may receive one or more queries 75 from users and may generate prioritized relationship data 85 based on email traffic between one or more persons and one or more target individuals 80. In some embodiments, a user at client 70 generates query 75 by inputting relevant parameters into a GUI associated with client 75 such as, for example, a first name, last name, and/or middle name (or initial thereof) and/or a company name, a domain associated with a company, and/or other suitable information associated with target individual 80. Client 70 may transmit query 75 over network 60 to email analyzer 20.

At appropriate points during operation, email analyzer 20 may receive email data 25 from email server 30 and/or email repository 40. Email analyzer 20 may filter and/or correlate email data 25 to generate relationship data 85 based on email traffic. Email analyzer 20 may use filtered and/or correlated email data 25 to deteiinine a volume of email traffic sent to and/or from target individual 80. Based on the volume of email traffic, email analyzer 20 may identify and classify relationships between one or more persons and target individual 80. For example, email analyzer 20 may determine that ten or more emails have been sent and/or received between Person A in enterprise 15 and target individual 80. Based on this volume of email traffic, email analyzer 20 may, for example, classify the relationship between Person A and target individual 80 as strong. As another example, email analyzer 20 may determine that between five and ten emails have been sent and/or received between Person B in enterprise 15 and target individual 80. Based on this volume of email traffic, email analyzer 20 may, for example, classify the relationship between Person B and target individual 80 as moderate.

After classifying one or more relationships of target individual 80 specified in query 75, email analyzer 20 may transmit relationship data 85 to clients 70. In particular embodiments, relationship data 85 may be transmitted over network 60. Relationship data 85 may include data representing one or more attributes of a relationship. For example, relationship data 85 may include the name of a person with whom target individual 80 corresponds via email, the source of the person's contact information (e.g., email traffic, contact manager database, and/or other database), and an indicator of the strength of the relationship (e.g. "Knows Well," "Acquaintance," etc.). In some embodiments, relationship data 85 may be displayed on a GUI by client 70 in a prioritized manner based on the strength of the relationship.

One or more embodiments of system 10 may provide important technical advantages. For example, system 10 may provide an intelligent display of relationship data 85 based on email traffic to or from enterprise 15. In some embodiments, system 10 facilitates the intelligent collection, filtration, and/or correlation of emails sent to or from enterprise 15. If a user desires to identify a network of business relationships for target individual 80 inside or outside of enterprise 15, system 10 may allow the user to input information associated with the target individual 80, such as a first name, a last name, a middle name (or initial thereof), a company name, and/or a domain associated with a company. System 10 may then generate a list of possible email addresses for target individual 80. Using email data 25, system 10 may identify and display relationships of target individual 80. The relationships may be prioritized based on the strength of each relationship. Thus, without knowing the actual email address of target individual 80, system 10 may allow a user to discover information about any existing relationships between individuals inside or outside an enterprise and target individual 80. Particular embodiments of system 10 may provide some, none, or all of the foregoing advantages.

Figure 2:
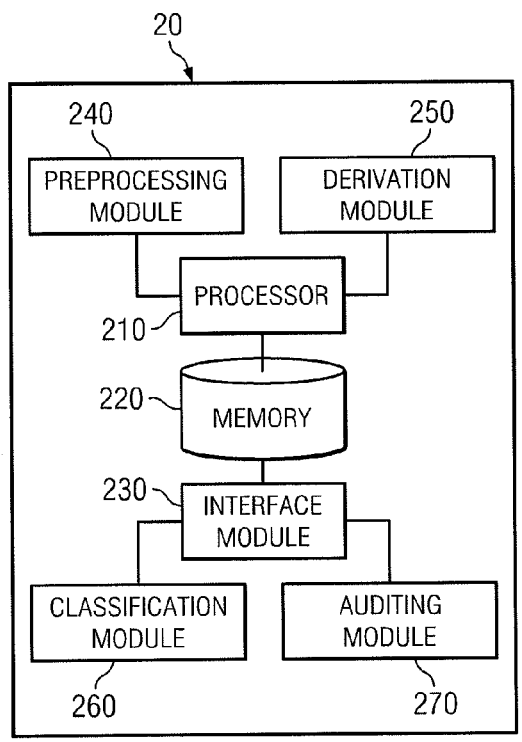
FIG. 2 illustrates an email analyzer from the system illustrated in FIG. 1, according to certain embodiments.

FIG. 2 illustrates email analyzer 20 in system 10, according to certain embodiments. Email analyzer 20 may generally receive, process, sort, analyze, and/or intelligently display information associated with emails sent to or from enterprise 15. In particular embodiments, email analyzer 20 may audit users of system 10 and/or may audit queries 75 associated with the use of email analyzer 20. Email analyzer 20 may include a processor 210, memory 220, interface module 230, preprocessing module 240, derivation module 250, classification module 260, and auditing module 270.

Processor 210 may represent and/or include any form of processing component, including general purpose computers, dedicated microprocessors, or other processing devices capable of processing electronic information. Examples of processor 210 include digital signal processors (DSPs), application-specific integrated circuits (ASICs), field-programmable gate arrays (FPGAs), and any other suitable specific or general purpose processors. Although FIG. 2 illustrates a single processor 210 in email analyzer 20, email analyzer 20 may include any suitable number of processors 210. In embodiments of system 10 in which email analyzer 20 represents software executing on other components of system 10, processor 210 may represent a processor utilized in performing operations associated with the particular component on which email analyzer 20 is operating.

Processor 210 may be communicatively coupled to memory 220. Memory 220 may store processor instructions, queries 75, results of queries 75, email data 25, audit results, and/or any suitable information. Memory 220 may comprise any collection and arrangement of volatile and/or non-volatile components suitable for storing data. For example, memory 220 may comprise random access memory (RAM) devices, read only memory (ROM) devices, magnetic storage devices, optical storage devices, and/or any other suitable data storage devices. In particular embodiments, memory 220 may represent, in part, computer-readable storage media on which computer instructions and/or logic are encoded. In such embodiments, some or all the described functionality of email analyzer 20 may be provided by processor 210 executing the instructions encoded on the described media. Although shown in FIG. 2 as a single component, memory 220 may represent any number of memory components within, local to, and/or accessible by email analyzer 20. Although shown in FIG. 2 as being located internal to email analyzer 20, memory 220 may represent storage components remote from email analyzer 20 such as, for example, components of a Network Attached Storage (NAS), Storage Area Network (SAN), or any other type of remote storage system.

Processor 210 may be communicatively coupled to one or more interface modules 230 in email analyzer 20. Interface module 230 may facilitate communication between email analyzer 20, email server 30, email repository 40, clients 70, and/or other components of system 10. For example, email analyzer 20 may receive query 75 from client 70 through interface module 230. Through interface module 230, email analyzer 20 may receive email data 25 from email server 30 and/or email repository 40. In particular embodiments, interface module 230 may include or represent one or more interface cards suitable for communication over network 60. Although FIG. 2 illustrates a single interface module 230 in email analyzer 20, email analyzer 20 may include any suitable number of interface modules 230.

Email analyzer 20 may comprise one or more preprocessing modules 240. Preprocessing module 240 may generally receive, filter, and/or correlate raw email data 25 from email repository 40. Processor 210 may use the filtered and/or correlated email data 25 output by preprocessing module 240 to determine results of queries 75 from users. Preprocessing module 240 may receive email data 25 from email repository 40 in real-time and/or in periodic batches. For example, preprocessing module 240 may receive and process email data 25 once every month, once every week, and/or according to any appropriate schedule. Once raw email data 25 is received, whether in real-time or in batches, preprocessing module 240 may process the raw email data 25 to generate correlated and/or filtered email data 25 that may be efficiently searched. For example, in particular embodiments, preprocessing module 240 may isolate header information from emails in raw email data 25. Preprocessing module 240 may filter subject information (e.g., the subject line of an email) and/or message text from the emails in the raw email data 25. That is, preprocessing module 240 may isolate message text from relevant emails and store and/or process all or only header information. Preprocessing module 240 may, additionally or alternatively, correlate redundant instances of emails from email data 25 (e.g., redundant emails may result from distribution lists and/or from emails sent to multiple recipients). Some and/or all of the functions of preprocessing module 240 described above may be performed by email server 30.

In some embodiments, preprocessing module 240 may correlate emails in email data 25 from email repository 40 based on senders and recipients. For example, preprocessing module 240 may group together an email sent from Person A to Person B and a reply from Person B to Person A. Preprocessing module 240 may capture email addresses from the header information associated with emails. For example, preprocessing module 240 may identify and store email addresses from the "To" field, the "From" field, the "Cc" field, and/or the "Bcc" field of emails. Preprocessing module 240 may, additionally or alternatively, link information in email data 25 to electronic directories. For example, preprocessing module 240 may identify an email address in the header information of email data 25 and may retrieve additional information corresponding to the email address (e.g., a name, telephone number, address, etc.) from one or more additional data sources such as, for example, a contacts database, a human resources database, etc. In particular embodiments, preprocessing module 240 may receive information from one or more external data sources 50 and may determine whether emails sent to or from individuals or organizations identified by external data sources 50 correspond to emails in email data 25 from email server 30 or email repository 40.

Email analyzer 20 may comprise one or more derivation modules 250. Derivation module 250 may generate, based on received query terms, a list of potential email addresses for target individual 80. Thus, a user of system 10, without knowing the actual email address of target individual 80, may input a first name, last name, middle name (or initial thereof), company name, and/or domain associated with a company of target individual 80, and derivation module 250 may generate a list of potential email addresses. Derivation module 250 may generate the list of possible email addresses using rules based on statistical data regarding common structures and syntax for prefixes and/or domains of email addresses. Using statistical data may allow derivation module 250 to generate likely email addresses of target individual 80 instead of merely random permutations of character data. Each possible email address may be derived from different permutations of the initials, the first name, the last name, the middle name, the company name, the company domain, and/or one or more other characters associated with target individual 80. For example, a user of system 10 may wish to identify persons who know John Q. Public of Company1 Company. The user may formulate a query by inputting "John Q. Public" as the name and "Company1 Company" as the company of target individual 80. Derivation module 250 may then use statistical data to generate a list of potential email addresses (e.g., j.public@company1.com, j.q.public@company1.com, j-public@company1.com, etc.). In some embodiments, email analyzer 20 may filter one or more numeric characters from prefixes of email addresses in conjunction with searching for relationships and/or analyzing email traffic.

Derivation module 250 may rank the potential email addresses based at least in part on the frequency at which the associated prefix and/or domain structure (e.g., firstinitial.lastname, firstname.middleinitial.lastname, etc.) appear in archived email data 25. Based on the potential email addresses generated by derivation module 250, email analyzer 20 may search email data 25 output by preprocessor module 240 to identify relationships between target individual 80 and other people. The relationships may be identified based on email traffic between the potential email addresses generated by derivation module 250 and other email addresses.

Email analyzer 20 may comprise one or more classification modules 260. Classification module 260 may identify and intelligently display information regarding relationships between individuals within or without enterprise 15. As discussed above, email analyzer 20 may identify relationships based on email traffic between potential email addresses of target individual 80 (as generated by derivation module 250) and other email addresses. Classification module 260 may then intelligently sort the relationships according to the type of each relationship. For example, if contact classification module 260 finds ten or more emails from target individual 80 to Person A and only two emails from Person A to target individual 80, then classification module 260 may classify the relationship with Person A as "High Inbound/Low Outbound." In another example, if classification module 260 finds five or fewer emails from target individual 80 to Person A and five emails from Person A to target individual 80, classification module 260 may classify the relationship as "Moderate Inbound/Moderate Outbound." The volume of emails corresponding to each particular threshold and the number of thresholds used may be configurable according to the needs of the user and/or enterprise 15 and the overall capabilities of system 10. In some embodiments, classification module 260 may classify the relationship for each person with whom target individual 80 corresponds. Classification module 260 may present an intelligent display that sorts the relationships according to type. For example, in particular embodiments, relationships classified as "High Inbound/High Outbound" may be displayed first, while relationships classified as "Low Inbound/Low Outbound" may be displayed last. The particular types of relationships displayed, as well as the order in which they are displayed, may be configurable by a user of system 10.

In particular embodiments, classification module 260 may classify relationships based, at least in part, on factors other than email traffic. For example, the classification may be based, at least in part, on email directories and/or contact lists. Classification module 260 may be capable of receiving contact information from email server 30 and/or email repository 40. For example, email server 30 and/or email repository 40 may store or maintain a contacts database using contact management software such as, for example, Microsoft Outlook and/or Lotus Notes. In particular embodiments, each user in system 10 maintains a respective directory of contacts. A user's directory of contacts may be stored on that user's computer and/or in memory in email server 30 and/or email repository 40. A particular user may use contact management software to designate certain contacts in the contacts database as being strong or weak. For example, particular contacts may be marked as "Knows Well," as "Knows a Little," as "Acquaintance," etc. Based on the strength of the relationship, classification module 260 may give a higher or lower priority to a particular relationship in the display of relationship data 85. Stronger relationships may be listed above weaker relationships.

In some embodiments, classification module 260 may identify and de-prioritize spam emails and/or may mask certain data (e.g., employee names, employee identification numbers, etc.) depending on the security clearance of the user. The amount and/or type of information presented in a display of relationship data 85 may be configurable based on the security clearance of the user that generated the particular query 75. For example, user names, identifying information, and/or email addresses may be hidden or revealed based on the role of the user within enterprise 15. Thus, classification module 260 may provide an intelligent display of relationships based on email traffic and/or other information sources.

Email analyzer 20 may comprise one or more auditing modules 270. Auditing module 270 may generally determine, maintain, and/or display an audit trail for each query 75 conducted by a user of system 10. The audit trail for a particular query 75 may comprise various data attributes such as, for example, the name of the user performing the search, the type of search (e.g., company name, individual name, email address, etc.), the company and/or individual name in query 75, the time of query 75, etc. In particular embodiments, if the volume and/or frequency of queries 75 by a particular user of system 10 exceeds a configurable threshold, auditing module 270 may notify an administrator or other operator of system 10. In particular embodiments, auditing module 270 may send an email that includes a report regarding the search history of the particular user. Additionally or alternatively, auditing module 270 may provide a real-time audit log of queries 75 generated by users of system 10 and/or executed by email analyzer 20. Thus, auditing capabilities provided by auditing module 270 may allow system 10 to detect and prevent misuse of particular features of system 10.

Each of processor 210, memory 220, interface module 230, preprocessing module 240, derivation module 250, classification module 260, and auditing module 270 may represent any appropriate combination of hardware and/or software suitable to perform the described functions. Elements of email analyzer 20 may include logic encoded on tangible, computer-readable media and executed on processor 210 and/or other computer hardware suitable to provide the described functions of email analyzer 20. Additionally, any two or more of the described modules may represent or include common components.

Figure 3:
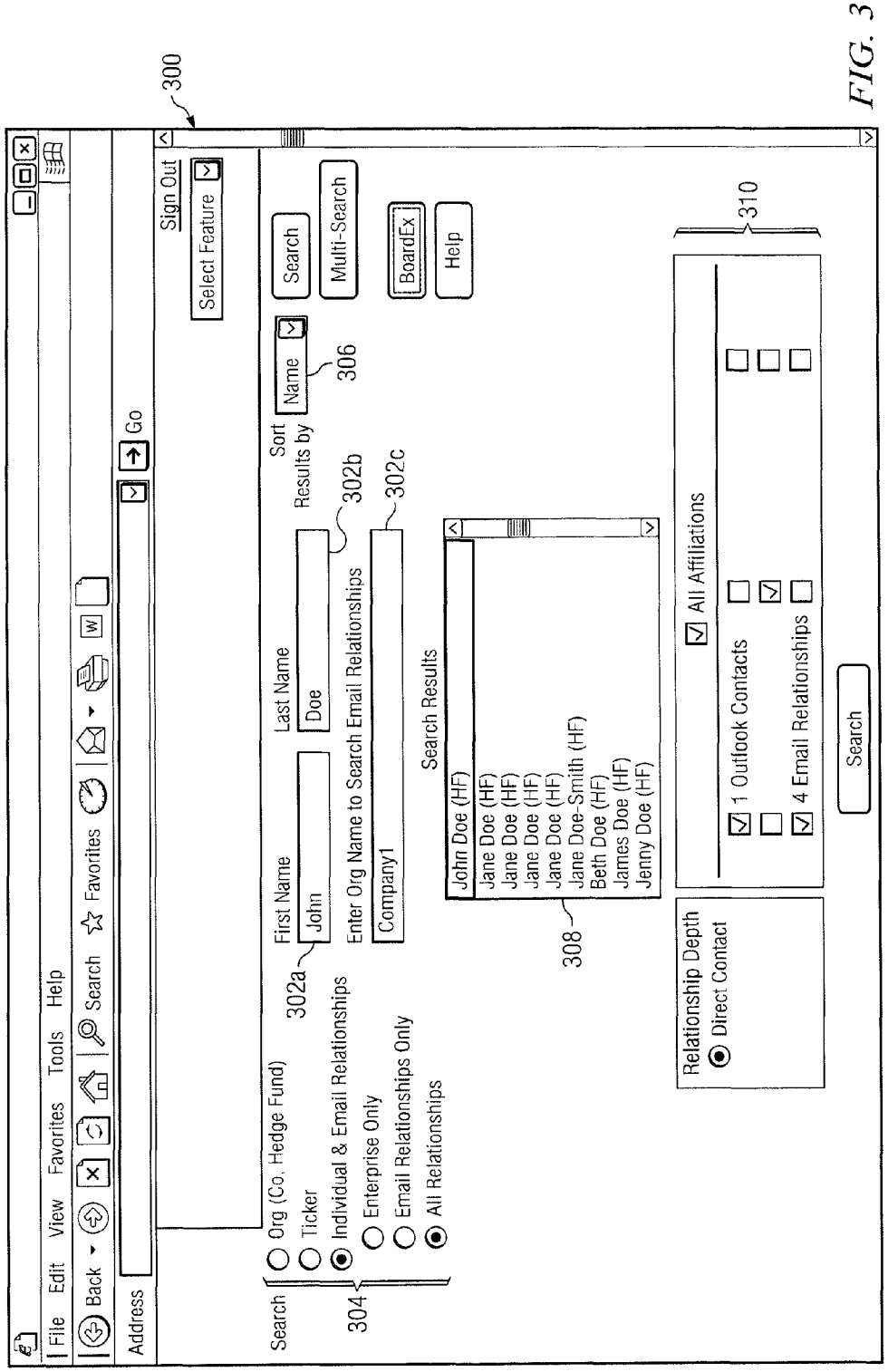
FIG. 3 illustrates an example Graphical User Interface ("GUI") that assists a user in formulating a query for information regarding a target individual, according to certain embodiments.

FIG. 3 illustrates an example Graphical User Interface ("GUI") 300 that assists a user in formulating query 75 for information regarding target individual 80, according to certain embodiments. Client 70 may display GUI 300 to a user. By interacting with GUI 300, the user may generate queries 75 for target individuals 80 and may view information regarding relationships of target individual 80. GUI 300 may include input boxes 302*a*, 302*b*, and 302*c* that allow the user to formulate query 75. Input box 302*a* may receive user input for a first name of target individual 80. Input box 302*b* may receiver user input for a last name of target individual 80. Input box 302*c* may receive user input for a company name and/or domain associated with a company of target individual 80. In particular embodiments, a user may formulate query 75 by inputting information into one or more of input boxes 302. In some embodiments, GUI 300 may include additional input boxes 302 whereby a user may input additional information including, for example, an email address, a work address, a telephone number, etc.

In some embodiments, GUI 300 includes a search type selector 304 that allows a user to designate the type of query to be performed. Search type selector 304 may include options for "Enterprise Only," "Email Relationships Only," and "All Relationships." Selecting "Enterprise Only" may enable queries 75 for contacts within a contacts database maintain by system 10 and/or external information sources 50. Selecting "Email Relationships Only" may enable queries for relationships between target individual 80 and persons in enterprise 15 (e.g., by searching email data 25 for emails between target individual 80 and a person in enterprise 15). Selecting "All Relationships" may enable searching for relationships between target individual 80 and persons in enterprise 15 (e.g., by searching a contacts database, external information sources 50, and/or email data 25 for emails associated with target individual 80).

In some embodiments, GUI 300 comprises a sort box 306 that allows a user to select a preference for the order in which results are displayed. For example, a user may wish to see results of a particular query 75 in the order of last name, first name, organization, etc. Thus, sort box 306 may be a drop-down box that contains one or more of these or other sorting options.

In some embodiments, GUI 300 comprises a search results box 308 that displays the results of query 75 for target individual 80. For example, as shown in FIG. 3, a user has input query 75 for target individual 80 named "John Doe." The user has selected "All Relationships" in search type selector 304. As discussed above, email analyzer 20 may generate a list of potential email addresses for target individual 80. Email analyzer 20 may then search email data 25 received from email server 30 and/or email repository 40 for one or more of the potential email addresses. As shown in the illustrated example, search results box 308 may display one or more potential matching names for the particular target individual 80. Once displayed, a user may select a particular name to obtain more information about target individual 80.

In some embodiments, GUI 300 may comprise a display option box 310 that may filter names displayed in search results box 308. In particular embodiments, by selecting various options, a user may be able to display only names found in a contacts database, found through email data 25, and/or found through any other relevant source. Conversely, by unselecting one or more options, a user may be able to hide names found in a contacts database, through email data 25, and/or through any other relevant source.

FIG. 4 illustrates a table 400 comprising example email permutations generated by email analyzer 20, according to certain embodiments. As discussed above, email analyzer 20 may generate, based on received query terms, a list of potential email addresses for target individual 80. Thus, email analyzer 20 may allow a user to search email data 25 for relationships with target individual 80 without necessarily knowing the actual email address or addresses of target individual 80. Accordingly, a user of system 10, without knowing the actual email address of a person inside or outside of enterprise 15, may input the person's first name, last name, middle name (or initial), company name, and/or company domain. Email analyzer 20 may then generate a list of likely email addresses. In the illustrated example, email analyzer 20 received query 75 for target individual 80 named "John Q. Public" who works at "Company1 Company." Email analyzer 20 may generate likely email addresses based on one or more of (in whole or in part) a first name, a middle name, a last name, a company name, and/or one or more additional characters. Email analyzer 20 may use all or part of the first name, middle name, and/or last name to generate one or more likely email prefixes. Email analyzer 20 may use all or part of the company name to generate one or more likely email domains. The term prefix may refer to the portion of an email address before the "@" symbol, and the term domain may refer to the portion of an email address after the "@" symbol. Email analyzer 20 may determine various prefixes and domains based at least in part on statistical data regarding common syntaxes and structures of email addresses. Although FIG. 4 illustrates for purposes of example a particular list of possible email addresses, numerous other possible addresses may be generated by email analyzer 20.

FIG. 5 illustrates an example GUI 500 displaying the results of query 75, according to certain embodiments. GUI 500 may comprise a classification matrix 510, one or more priority rules 520, and at least one results table 530. Matrix 510 may visually depict logic for classifying the strength of relationships associated with target individual 80. In particular, matrix 510 may depict a sorting algorithm for classifying email traffic sent to and/or received from target individual 80.

For example, matrix 510 may comprise rows that represent the volume of outbound email sent from Person A to Person B. Person A and/or Person B may be within or without enterprise 15. The columns in matrix 510 may represent the volume of inbound email sent from Person B to Person A. For each of the vertical and horizontal sets of data, "None" may indicate that no email was sent or received. "L" may indicate that a relatively low amount of emails were sent or received. Thus, "L" may represent an amount less than first threshold number of emails sent and/or received between Person A and Person B. "M" may indicate that a moderate amount of emails were sent or received. "M" may represent an amount between a first threshold and a second threshold. "H" may indicate that a high volume of emails were sent or received. "H" may represent an amount equal to or greater than the second threshold. Each of the respective first and second thresholds may be configurable based on the total number of emails received, the strength of the business relationships, and/or any other relevant considerations, factors, and/or variables. An intersection of "H" inbound emails and "H" outbound emails may indicate a strong (or "A") relationship between Person A and Person B. In the example shown, any combination of "H-H" or "H-M" may be designated as an "A" relationship. Similarly, "B" relationships may include any combination of "L-H" and/or "L-M." Any combination including a designation of "None" may indicate that there is no meaningful relationship (i.e., a "C" relationship). Based at least in part on the particular designation ("A," "B," or "C,"), email analyzer 20 may prioritize relationships when presenting a list of relationships to a user.

In some embodiments, priority rules 520 may define a particular preference order for sorting and/or displaying relationships. For example, based at least in part on priority rules 520, email analyzer 20 may sort and/or display relationships in a particular order, including but not limited to: (1) relationships between board members of enterprise 15 and an outside organization; (2) relationships where at least one correspondent is designated in a contacts database as "Know Well"; (3) email traffic in which the relationship between correspondents is designated as an "A" relationship as described above; (4) email traffic in which the relationship between correspondents is designated as a "B" relationship as described above; (5) relationships where at least one correspondent is designated in a Microsoft Outlook contacts database as "Know A Little"; and (6) email traffic in which the relationship between correspondents is designated as a "C" relationship. The particular order specified by priority rules 520 may be configurable in accordance with the wishes or needs of a particular user of system 10.

Results table 530 may display one or more relationships identified by email analyzer 20 in response to query 75 from a user. In the illustrated example, results table 530 displays various relationships of target individual 80 named "Jane R. Doe." Results table 530 may optionally display (1) the parties to the relationship (e.g., a person within enterprise 15 that has a relationship with target individual 80); (2) the role (e.g., job title) of each party; (3) the volume of email between the two parties (either inbound, outbound, or both); (4) whether target individual 80 appears in the contacts database of a party; and/or (5) whether target individual 80 is designated as "Knows Well" or "Knows A Little" in a contacts database. Results table 530 may display a prioritized list of relationships in accordance with the preference order specified by priority rules 520. Depending on a user's level of access, GUI 500 may display an actual number of emails sent to and/or from target individual 80, or GUI 500 may display a general description of the number of emails sent and/or received (e.g., high, medium, or low).

Figure 6:
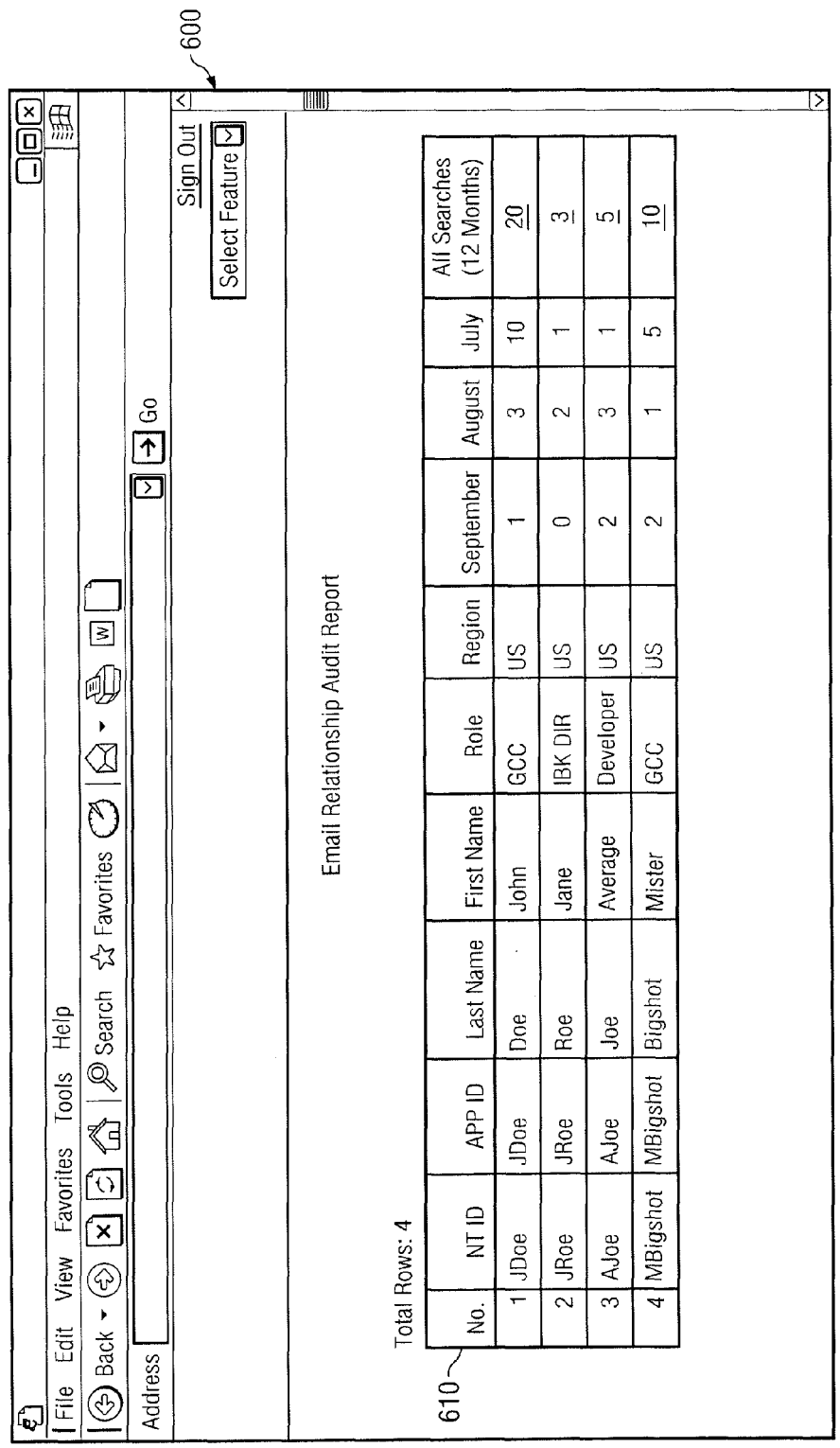
FIG. 6 illustrates an example GUI showing an audit report generated by an email analyzer, according to certain embodiments.

FIG. 6 illustrates GUI 600 showing an example audit report generated by email analyzer 20, according to certain embodiments. As discussed above, email analyzer 20 may determine and display an audit trail for queries 75 conducted by each user of system 10. An administrator of system 10 may request email analyzer 20 to generate an audit trail for one or more users. GUI 600 may include at least one table 610 that includes a plurality of fields for each user audited. Table 610 may display one or more user identifiers, a last name, a first name, a role within enterprise 15, a region, a number of queries generated by each user during particular months, and the total number of queries generated by a user during a configurable time period (e.g., over the last year). GUI 600 may allow the administrator to select a particular user to request additional information relating to a particular audit trail. A particular audit trail may comprise various data attributes such as, for example, the name of the user performing the search, the type of search (e.g., company name, individual name, exact email address, etc.), the company and/or individual name in the query 75, the time of the search, and/or any other appropriate attributes. Email analyzer 20 may be configured to generate periodic reports based at least in part on predetermined thresholds of usage activity. Further, as discussed above, an audit report containing one or more tables 610 may be automatically generated and sent to an administrator based on a predetermined configuration. For example, an audit report may be generated and/or sent periodically (e.g., once every month, once every six months, etc.) or may be generated upon request by an administrator. In some embodiments, an audit report may be generated and/or sent based on the volume and/or frequency of queries 75 by a particular user exceeding a configurable threshold.

Figure 7:
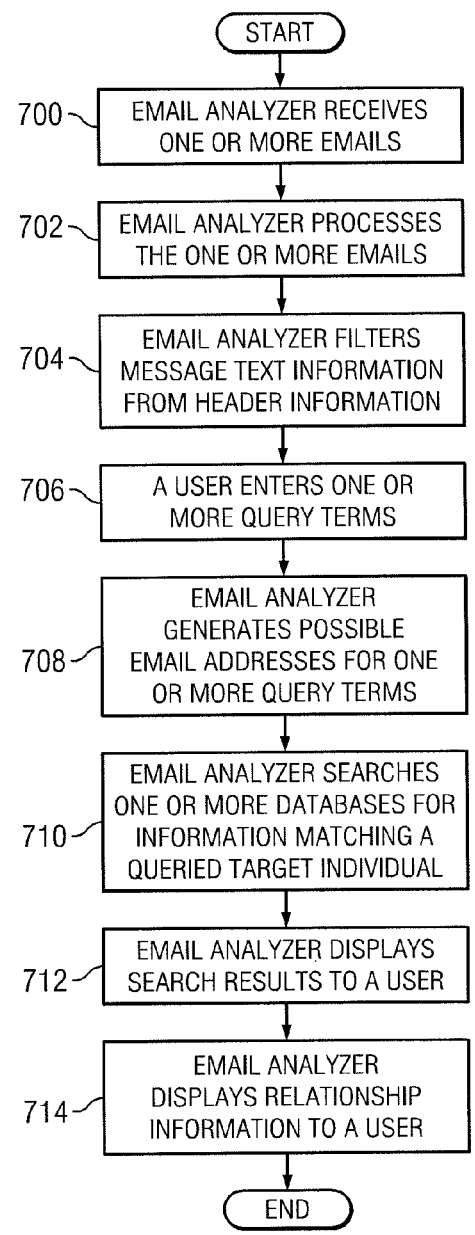
FIG. 7 illustrates a flow diagram for analyzing email traffic to identify business relationships, according to certain embodiments.

FIG. 7 is a flow diagram illustrating an operation in accordance with a particular embodiment of system 10. In the illustrated example, operation begins at step 700 with email analyzer 20 receiving one or more emails from email server 30. In particular embodiments, email analyzer 20 may receive email data 25 from email server 30 and/or email repository 40. Email analyzer 20 may receive email data 25 in real-time or in periodic batches. For example, email analyzer 20 may receive email data 25 once every month, once every week, and/or according to any appropriate schedule. Email analyzer 20 may be capable of receiving email data 25 in response to query 75 or command by a user of system 10.

At step 702, email analyzer 20 may process, correlate, and/or filter emails in email data 25. As discussed above, email analyzer 20 may process raw email data 25 to generate correlated and filtered email data 25 that may be efficiently searched. For example, email analyzer 20 may correlate redundant instances of emails (e.g., redundant emails may result from distribution lists or from emails sent to multiple recipients). Email analyzer 20 may correlate emails based on senders and recipients. For example, email analyzer 20 may group together an email sent from Person A to Person B and a reply from Person B to Person A. Email analyzer 20 may group together an email sent from Person A to Person B and a forwarded email from Person B to Person C. In general, emails may be associated in any appropriate manner suitable to facilitate efficient searching and/or processing in system 10.

At step 704, email analyzer 20 may isolate message text information from header information in email data 25. For example, in particular embodiments, email analyzer 20 may isolate header information in email data 25 and filter the message text from the email data 25. That is, email analyzer 20 may strip message text from relevant emails and store and/or process only header information. In some embodiments, email analyzer 20 may filter subject information from the header information in email data 25. Email analyzer 20 may capture email addresses from header information in email data 25. For example, email analyzer 20 may analyze header information in email data 25 and store one or more email addresses contained in the header information (e.g., email addresses contained in the "To" field, the "From" field, the "Cc" field, or the "Bcc" field). Email analyzer 20 may additionally link data in emails to electronic directories. As discussed above, in particular embodiments, email analyzer 20 may receive information from one or more external data sources 50 and may determine whether emails sent to or from individuals or organizations identified by external data sources 50 correspond to email data 25 received from email server 30 or email repository 40. In particular embodiments, email analyzer 20 may store the correlated and filtered email data 25 in a memory associated with email analyzer 20.

At step 706, a user of system 10 may enter one or more query terms. In particular embodiments, a user of system 10 may query whether persons within or without enterprise 15 have relationships with target individual 80. Using a GUI at client 70, a user may query system 10 for information about target individual 80. By interacting with a GUI, a user of system 10 may be able to generate queries 75 for target individuals 80 and receive responses for potential relationships that may match the relevant information entered.

At step 708, email analyzer 20 may generate possible email addresses for a given query 75. As discussed above, email analyzer 20 may generate, based on received query terms, a list of potential email addresses for target individual 80. In general, email analyzer 20 may allow a user to search email data 25 for relationships with target individual 80 without necessarily knowing the exact email address or addresses of target individual 80.

At step 710, email analyzer 20 may search one or more databases for information matching the queried target individual 80. In particular embodiments, email analyzer 20 may search stored and/or correlated email data 25 received in step 704 for email addresses that match one or more of the email addresses generated in step 708. Additionally, email analyzer 20 may search a contacts database for a name, email address, company name, and/or other information that matches target individual 80 queried in step 706. Email analyzer, in particular embodiments, may search one or more external information sources 50 for a name, email address, company, and/or other information that matches target individual 80 queried in step 706.

At step 712, email analyzer 20 displays search results to a user. As discussed above with respect to FIG. 3, email analyzer 20 may display search results for a particular target individual 80 in a search results box in a GUI associated with client 70. Search results may be grouped in order of relevance and/or in accordance with the particular source from which a particular result was found. For example, email analyzer 20 may search for information in one or more databases, including external information sources 50, correlated and/or stored email data 25, and a contacts database. As discussed above, email analyzer 20 may generate a list of potential email addresses for the name and/or organization entered and may search email information received from email server 30 and/or email repository 40 for one or more of the generated email address.

At step 714, email analyzer 20 may display relationship data 85 to a user. In particular embodiments, email analyzer 20 may transmit relationship data 85 to a particular client 70 to be displayed on a GUI. Relationship information may include information pertaining to individuals within or without enterprise 15 that have a relationship with target individual 80, an indication of the strength of each such relationship, information regarding the volume of emails between the person and target individual 80, and/or the particular database in which target individual 80 was found by email analyzer 20. Email analyzer 20 may classify the relationships for each person with whom target individual 80 corresponds. For example, if email analyzer 20 finds ten or more emails from target individual 80 to Person A and only two emails from Person A to the target individual, then the relationship with Person A may be classified as "High Inbound/Low Outbound." In another example, if there are five or fewer emails from target individual 80 to Person A and five emails from Person A to the target individual, email analyzer 20 may classify the relationship as "Moderate Inbound/Moderate Outbound."

The volume of emails corresponding to each particular threshold, and the number of thresholds use may be configurable according to the needs of enterprise 15 and the overall capabilities of system 10. Based on the relevant classifications and/or identification of potential relationships, email analyzer 20 may present an intelligent display that sorts the relationships according to type. For example, in particular embodiments, relationships classified as "High Inbound/High Outbound" may be displayed first, while relationships classified as "Low Inbound/Low Outbound" may be displayed last. Additionally, the particular types of relationships displayed, as well as the order in which they are displayed may be configurable by an operator of system 10. In particular embodiments, email analyzer 20 may base a classification of a relationship on factors other than emails between target individual 80 and one or more persons in enterprise 15. For example, the classification may be based, at least in part, on email directories and/or contact databases. Email analyzer 20 may be capable of receiving contact information from email server 30 and/or email repository 40. For example, email server 30 and/or email repository 40 may store and/or maintain a contacts database used by contact management software. Contacts that are marked as "Knows Well" may be given higher priority in the display of relationship information. In some embodiments, email analyzer 20 may identify and de-prioritize spam emails and/or may mask certain data (e.g., employee names, employee identification numbers, passwords, etc.) depending on the security clearance of the user. Thus, email analyzer 20 may provide an intelligent display of relationships based on email traffic and/or other information sources. Once presented with an ordered and intelligently displayed list of relationships, a user of system 10 may leverage the relationships for further business interactions.

The steps illustrated in FIG. 7 may be combined, modified, or deleted where appropriate, and additional steps may also be added to those shown. Additionally, the steps may be performed in any suitable order without departing from the scope of the present disclosure.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
    identifying, with a processor, one or more relationships between a target individual and one or more persons based at least in part on a plurality of emails, wherein the plurality of emails comprises:
        one or more outbound emails, the one or more outbound emails comprising emails sent to the target individual from the one or more persons; and
        one or more inbound emails, the one or more inbound emails comprising emails sent from the target individual to the one or more persons;
    for each of the one or more relationships, calculating an amount of outbound emails;
    for each of the one or more relationships, calculating an amount of inbound emails;
    configuring a first outbound threshold for the amount of outbound emails;
    configuring a first inbound threshold for the amount of inbound emails;
    assigning, with the processor, a classification to each of the one or more relationships based at least in part on a comparison of the amount of outbound emails to the first outbound threshold and a comparison of the amount of inbound emails to the first inbound threshold;
    sorting, with the processor, the one or more relationships based at least in part on the classification assigned to each of the one or more relationships;
    storing information regarding the sorted relationships; and
    displaying a classification matrix on a graphical user interface, wherein the classification matrix visually depicts logic for assigning a classification to the one or more relationships based on a plurality of inbound thresholds and a plurality of outbound thresholds.

2. The method of claim 1, further comprising displaying on the graphical user interface the one or more sorted relationships.

3. The method of claim 1, wherein sorting the relationships is further based upon priority rules.

4. An apparatus, comprising:
    a processor operable to:
        identify one or more relationships between a target individual and one or more persons based at least in part on a plurality of emails, wherein the plurality of emails comprises:
            one or more outbound emails, the one or more outbound emails comprising emails sent to the target individual from the one or more persons; and
            one or more inbound emails, the one or more inbound emails comprising emails sent from the target individual to the one or more persons;
        for each of the one or more relationships, calculate an amount of outbound emails;
        for each of the one or more relationships, calculate an amount of inbound emails;
        configure a first outbound threshold for the amount of outbound emails;
        configure a first inbound threshold for the amount of inbound emails;
        assign a classification to each of the one or more relationships based at least in part on a comparison of the amount of outbound emails to the first outbound threshold and a comparison of the amount of inbound emails to the first inbound threshold;
        sort the one or more relationships based at least in part on the classification assigned to each of the one or more relationships; and
        display a classification matrix on a graphical user interface, wherein the classification matrix visually depicts logic for assigning a classification to the one or more relationships based on a plurality of inbound thresholds and a plurality of outbound thresholds; and
    a memory coupled to the processor and operable to store information regarding the sorted relationships.

5. The apparatus of claim 4, wherein the processor is further operable to display on the graphical user interface the one or more sorted relationships.

6. The apparatus of claim 4, wherein sorting the relationships is further based upon priority rules.

7. The method of claim 1, wherein assigning a classification to each of the one or more relationships comprises:
    assigning a first classification to a relationship if the amount of inbound emails is greater than the first inbound threshold, and the amount of outbound emails is greater than the first outbound threshold; and
    assigning a second classification to the relationship if the amount of inbound emails is less than the first inbound threshold, or if the amount of outbound emails is less than the first outbound threshold.

8. The method of claim 1, further comprising displaying masked relationship data on the graphical user interface, wherein the masked relationship data comprises the one or more sorted relationships with personal data hidden or revealed based on a security clearance of a user.

9. A method, comprising:
    identifying, with a processor, one or more relationships between a target individual and one or more persons based at least in part on a plurality of emails, wherein the plurality of emails comprises:
        one or more outbound emails, the one or more outbound emails comprising emails sent to the target individual from the one or more persons; and
        one or more inbound emails, the one or more inbound emails comprising emails sent from the target individual to the one or more persons;
    for each of the one or more relationships, calculating an amount of outbound emails;
    for each of the one or more relationships, calculating an amount of inbound emails;
    configuring a first outbound threshold for the amount of outbound emails;
    configuring a first inbound threshold for the amount of inbound emails;
    assigning, with the processor, a classification to each of the one or more relationships, the assigning comprising:
        assigning a first classification to a relationship if the amount of inbound emails is greater than the first inbound threshold, and the amount of outbound emails is greater than the first outbound threshold;
        assigning a second classification to the relationship if the amount of inbound emails is between zero and the first inbound threshold, and the amount of outbound emails is greater than zero, or if the amount of outbound emails is between zero and the first outbound threshold, and the amount of inbound emails is greater than zero; and
        assigning a third classification to the relationship if the amount of inbound emails is equal to zero, or if the amount of outbound emails is equal to zero;
    sorting, with the processor, the one or more relationships based at least in part on the classification assigned to each of the one or more relationships; and
    storing information regarding the sorted relationships.

10. The method of claim 9, further comprising displaying on a graphical user interface the one or more sorted relationships.

11. The method of claim 9, wherein sorting the relationships is further based upon priority rules.

12. The method of claim 9, further comprising displaying masked relationship data on a graphical user interface, wherein the masked relationship data comprises the one or more sorted relationships with personal data hidden or revealed based on a security clearance of a user.

13. An apparatus, comprising:
a processor operable to:
identify one or more relationships between a target individual and one or more persons based at least in part on a plurality of emails, wherein the plurality of emails comprises:
one or more outbound emails, the one or more outbound emails comprising emails sent to the target individual from the one or more persons; and
one or more inbound emails, the one or more inbound emails comprising emails sent from the target individual to the one or more persons;
for each of the one or more relationships, calculate an amount of outbound emails;
for each of the one or more relationships, calculate an amount of inbound emails;
configure a first outbound threshold for the amount of outbound emails;
configure a first inbound threshold for the amount of inbound emails;
assign a classification to each of the one or more relationships, the assigning comprising:
assigning a first classification to a relationship if the amount of inbound emails is greater than the first inbound threshold, and the amount of outbound emails is greater than the first outbound threshold;
assigning a second classification to the relationship if the amount of inbound emails is between zero and the first inbound threshold, and the amount of outbound emails is greater than zero, or if the amount of outbound emails is between zero and the first outbound threshold, and the amount of inbound emails is greater than zero; and
assigning a third classification to the relationship if the amount of inbound emails is equal to zero, or if the amount of outbound emails is equal to zero; and
sort the one or more relationships based at least in part on the classification assigned to each of the one or more relationships; and
a memory coupled to the processor and operable to store information regarding the sorted relationships.

14. The apparatus of claim 13, wherein the processor is further operable to display on a graphical user interface the one or more sorted relationships.

15. The apparatus of claim 13, wherein sorting the relationships is further based upon priority rules.

16. The apparatus of claim 13, wherein the processor is further operable to display masked relationship data on a graphical user interface, wherein the masked relationship data comprises the one or more sorted relationships with personal data hidden or revealed based on a security clearance of a user.

17. A method, comprising:
identifying, with a processor, one or more relationships between a target individual and one or more persons based at least in part on a plurality of emails, wherein the plurality of emails comprises:
one or more outbound emails, the one or more outbound emails comprising emails sent to the target individual from the one or more persons; and
one or more inbound emails, the one or more inbound emails comprising emails sent from the target individual to the one or more persons;
for each of the one or more relationships, calculating an amount of outbound emails;
for each of the one or more relationships, calculating an amount of inbound emails;
configuring a first outbound threshold and a second outbound threshold for the amount of outbound emails;
configuring a first inbound threshold and a second inbound threshold for the amount of inbound emails;
assigning, with the processor, a classification to each of the one or more relationships, the assigning comprising:
assigning a first classification to a relationship if the amount of inbound emails is greater than the second inbound threshold, and the amount of outbound emails is greater than the second outbound threshold;
assigning a second classification to the relationship if the amount of inbound emails is between the first inbound threshold and the second inbound threshold, and the amount of outbound emails is greater than the first outbound threshold, or if the amount of outbound emails is between the first outbound threshold and the second outbound threshold, and the amount of inbound emails is greater than the first inbound threshold;
assigning a third classification to the relationship if the amount of inbound emails is between zero and the first inbound threshold, and the amount of outbound emails is greater than zero, or if the amount of outbound emails is between zero and the first outbound threshold, and the amount of inbound emails is greater than zero; and
assigning a fourth classification to the relationship if the amount of inbound emails is equal to zero, or if the amount of outbound emails is equal to zero;
sorting, with the processor, the one or more relationships based at least in part on the classification assigned to each of the one or more relationships; and
storing information regarding the sorted relationships.

18. The method of claim 17, further comprising displaying on a graphical user interface the one or more sorted relationships.

19. The method of claim 17, wherein sorting the relationships is further based upon priority rules.

20. The method of claim 17, further comprising displaying masked relationship data on a graphical user interface, wherein the masked relationship data comprises the one or more sorted relationships with personal data hidden or revealed based on a security clearance of a user.

21. An apparatus, comprising:
a processor operable to:
identify one or more relationships between a target individual and one or more persons based at least in part on a plurality of emails, wherein the plurality of emails comprises:
one or more outbound emails, the one or more outbound emails comprising emails sent to the target individual from the one or more persons; and
one or more inbound emails, the one or more inbound emails comprising emails sent from the target individual to the one or more persons;
for each of the one or more relationships, calculate an amount of outbound emails;

for each of the one or more relationships, calculate an amount of inbound emails;
configure a first outbound threshold and a second outbound threshold for the amount of outbound emails;
configure a first inbound threshold and a second inbound threshold for the amount of inbound emails;
assign a classification to each of the one or more relationships, the assigning comprising:
  assigning a first classification to a relationship if the amount of inbound emails is greater than the second inbound threshold, and the amount of outbound emails is greater than the second outbound threshold;
  assigning a second classification to the relationship if the amount of inbound emails is between the first inbound threshold and the second inbound threshold, and the amount of outbound emails is greater than the first outbound threshold, or if the amount of outbound emails is between the first outbound threshold and the second outbound threshold, and the amount of inbound emails is greater than the first inbound threshold;
  assigning a third classification to the relationship if the amount of inbound emails is between zero and the first inbound threshold, and the amount of outbound emails is greater than zero, or if the amount of outbound emails is between zero and the first outbound threshold, and the amount of inbound emails is greater than zero; and
  assigning a fourth classification to the relationship if the amount of inbound emails is equal to zero, or if the amount of outbound emails is equal to zero; and
sort the one or more relationships based at least in part on the classification assigned to each of the one or more relationships; and
a memory coupled to the processor and operable to store information regarding the sorted relationships.

22. The apparatus of claim 21, wherein the processor is further operable to display on a graphical user interface the one or more sorted relationships.

23. The apparatus of claim 21, wherein sorting the relationships is further based upon priority rules.

24. The apparatus of claim 21, wherein the processor is further operable to display masked relationship data on a graphical user interface, wherein the masked relationship data comprises the one or more sorted relationships with personal data hidden or revealed based on a security clearance of a user.

25. The apparatus of claim 4, wherein assigning a classification to each of the one or more relationships comprises:
  assigning a first classification to a relationship if the amount of inbound emails is greater than the first inbound threshold, and the amount of outbound emails is greater than the first outbound threshold; and
  assigning a second classification to the relationship if the amount of inbound emails is less than the first inbound threshold, or if the amount of outbound emails is less than the first outbound threshold.

26. The apparatus of claim 4, wherein the processor is further operable to display masked relationship data on a graphical user interface, wherein the masked relationship data comprises the one or more sorted relationships with personal data hidden or revealed based on a security clearance of a user.

* * * * *